(12) United States Patent
Hauzery

(10) Patent No.: US 9,671,279 B2
(45) Date of Patent: Jun. 6, 2017

(54) OPTICALLY-POWERED SENSOR SYSTEMS PRINCIPALLY FOR DEPLOYMENT ON-BOARD AIRCRAFT AND IN WHICH OPTICAL DATA IS TRANSMITTED AS AVAILABLE ELECTRICAL ENERGY PERMITS

(71) Applicant: Zodiac Aerotechnics, Plaisir (FR)

(72) Inventor: Sylvain Hauzery, Villepreux (FR)

(73) Assignee: Zodiac Aerotechnics, Plaisir (FR)

( * ) Notice: Subject to any disclaimer, the term of this patent is extended or adjusted under 35 U.S.C. 154(b) by 252 days.

(21) Appl. No.: 14/133,823

(22) Filed: Dec. 19, 2013

(65) Prior Publication Data

US 2014/0166852 A1  Jun. 19, 2014

Related U.S. Application Data

(60) Provisional application No. 61/739,168, filed on Dec. 19, 2012.

(51) Int. Cl.
*G01J 1/02* (2006.01)
*G01D 5/26* (2006.01)

(52) U.S. Cl.
CPC ............ *G01J 1/0228* (2013.01); *G01D 5/268* (2013.01)

(58) Field of Classification Search
USPC ...... 250/216, 227.11, 227.12, 227.14–227.2, 250/227.21, 227.23, 227.24, 227.25, 250/573–577; 340/850–852, 901–905, 340/945, 963, 965, 500, 501, 531, 539.22, 340/539.23, 539.26, 540, 541, 545.3, 340/545.4, 552–567, 603–619, 626–634, 340/686.1; 385/1, 2, 4, 5, 8, 9, 12–53, 385/100–133
See application file for complete search history.

(56) References Cited

U.S. PATENT DOCUMENTS

| 4,641,025 | A | * | 2/1987 | Miller ................... G01F 23/292 250/227.11 |
| 4,820,916 | A | | 4/1989 | Patriquin |
| 4,963,729 | A | | 10/1990 | Spillman et al. |
| 5,144,517 | A | | 9/1992 | Wieth |
| 5,223,707 | A | | 6/1993 | Bjork |
| 5,528,409 | A | | 6/1996 | Cucci et al. |
| 6,600,972 | B2 | † | 7/2003 | Morrison |
| 7,511,259 | B2 | * | 3/2009 | Nyffenegger ........ G01D 5/2515 250/216 |

(Continued)

OTHER PUBLICATIONS

PCT/IB2013/061148, International Search Report and Written Opinion dated Apr. 10, 2014, 13 pages.

(Continued)

*Primary Examiner* — Tony Ko
(74) *Attorney, Agent, or Firm* — Kilpatrick Townsend & Stockton LLP; Dean W. Russell

(57) ABSTRACT

Described are optical sensing systems. The systems may perform reliably in explosive environments and provide eye protection should breakage of an optical fiber be detected. Sensors of the systems additionally may be self-managing, acquiring and transmitting sensed data as available electrical power permits. The systems beneficially may be used on-board aircraft.

21 Claims, 4 Drawing Sheets

(56) References Cited

U.S. PATENT DOCUMENTS

| | | | |
|---|---|---|---|
| 7,710,567 B1* | 5/2010 | Mentzer | G01F 23/2924 250/577 |
| 7,965,948 B1 | 6/2011 | Bugash et al. | |
| 8,547,037 B2* | 10/2013 | Yatsuda | F21V 29/30 315/209 R |
| 2002/0097482 A1* | 7/2002 | Sasaoka | H01S 3/302 359/334 |
| 2004/0021100 A1* | 2/2004 | Gouzman | G01F 23/2927 250/573 |
| 2008/0221825 A1 | 9/2008 | Nyffenegger et al. | |
| 2011/0127931 A1* | 6/2011 | Tamura | H05B 33/0806 315/312 |
| 2014/0331763 A1* | 11/2014 | Robb | G01F 23/266 73/304 C |

OTHER PUBLICATIONS

International Patent Application No. PCT/IB2013/061148, International Preliminary Report on Patentability dated Jul. 2, 2015.

\* cited by examiner
† cited by third party

FOPSSS functional overview

Example of possible FOPSS

Example of possible FOPSC

OPTICALLY-POWERED SENSOR SYSTEMS PRINCIPALLY FOR DEPLOYMENT ON-BOARD AIRCRAFT AND IN WHICH OPTICAL DATA IS TRANSMITTED AS AVAILABLE ELECTRICAL ENERGY PERMITS

CROSS-REFERENCE TO RELATED APPLICATION

This application claims the benefit of U.S. Provisional Patent Application Ser. No. 61/739,168, filed Dec. 19, 2012, and entitled "System for Airborne Optical Powered Smart Sensors," the entire contents of which application are incorporated herein by this reference.

FIELD OF THE INVENTION

This invention relates to sensing systems configured for reliable use in explosive (or other hazardous) environments and which provide eye protection should an optical fiber break. More particularly, the invention relates principally, but not necessarily exclusively, to systems in which free-running fuel sensors are powered optically on-board aircraft, with optical fibers both transmitting power to the sensors and receiving data signals from them.

BACKGROUND OF THE INVENTION

Various optically-powered sensor systems exist today. U.S. Pat. No. 4,820,916 to Patriquin discusses one such system, in which optical energy is transmitted along a bus for distribution to sensors of the system. Return pulses from the sensors likewise are transmitted on the bus to a system controller. Sensor-specific time delays are provided to produce a pre-determined, time-multiplexed sequence of the return pulses.

U.S. Pat. No. 4,963,729 to Spillman, et al., discloses techniques for improving signal conditioning in optically-powered sensor systems. As with the system of the Patriquin patent, that of the Spillman patent transmits optical energy along a bus for distribution to sensors of the system. The bus also transmits return pulses from the sensors.

Yet another optically-powered sensor system is identified in U.S. Pat. No. 5,223,707 to Bjork. In some versions of the system, a controller may provide optical power to sensors and receive optical signals from the sensor locations on a single optical fiber. Alternatively, multiple optical fibers may be employed. Protocols are described which allow multiple sensors to communicate with a controller over a single optical fiber.

U.S. Pat. No. 7,965,948 to Bugash, et al., finally, also addresses using a single fiber and systems for "receiving a light power signal via the single fiber optic . . . and, in response to a pause in the received light power signal, transmitting a light data signal via the single optical fiber." The systems may be deployed in aircraft fuel tanks, with optical fibers used in lieu of electrical wires. Incorporated herein in their entireties by this reference are the contents of the Patriquin, Spillman, Bjork, and Bugash patents.

Absent from any of these patents is, for example, any method of detecting or predicting breakage of an optical fiber. Likewise absent, therefore, is any systematic reaction to fiber breakage, which could result in injury should a human eye be exposed to an unattenuated light signal emanating from a broken fiber. Further absent from patents of this sort is any electronic safety barrier circuitry designed to limit supplied power below accepted maximums for explosive environments. Power-optimizing schemes in which sensors act based on available power rather than directly on command of a controller also are omitted; consequently, no extra energy (for "worst-case" scenarios) need necessarily be sent.

SUMMARY OF THE INVENTION

The present invention provides optically-powered sensing systems supplying these advantageous features. An optical interface uses light to deliver energy in order to power typically remote, isolated circuits. This approach avoids need for any metallic wires, use of which can increase risk of explosion in certain hazardous environments.

Photovoltaic power converters are currently available. However, many require levels of optical radiation greater than appropriate for use in explosive environments or when the radiation might impinge on a human eye. The present invention, by contrast, does not. Instead, systems of the present invention employ voltage- and current-limiting circuitry to limit optical radiation present in at least the explosive environments. Additional hardware (or software) controls may adjust or de-energize the light power source under conditions suggesting such adjustment or de-energization is likely appropriate.

Embodiments of the invention may include a system controller, one or more optical fibers, and one or more sensors. Typically multiple optical fibers and sensors are deployed, with a master microcontrol unit of the system controller separately controlling each sensor via a sensor control. Presently preferred is that a single optical fiber connect each sensor and its corresponding control—i.e. that a 1:1 correspondence exist between sensors and optical fibers—although such correspondence is not always necessary.

Beneficially included within sensors useful with the present inventions are such components as light couplers, photovoltaic cells, power supply management circuitry, controllers, and transducers. Data light emitters also may be included within the sensors. The emitters may transfer data via the optical fibers to the corresponding sensor controls.

Advantageously included with each sensor control may be a light power source, a light coupler, and a data light receiver. Also desirably comprising a sensor control may be circuitry providing automatic power reductions, normal and eye-protection light controls, and an electronic safety barrier. The safety barrier, when present, may function to ensure optical radiation levels do not exceed ignition levels of explosives extant in the environments of the systems, for example.

Preferably independent circuits, the normal and eye-protection controls allow adjustment of light power levels or de-energization of light power sources. Power level adjustments may be made normally for efficiency or unusually for eye protection, for example. Additionally, either circuit may de-energize a light power source when appropriate to do so. Automatic power adjustments, including de-energization of the light power source, also may occur if a sensor does not transmit light data within a pre-determined (or determinable) period—as, for example, when an optical fiber has broken.

As noted above, microcontrol units or other controllers may be included within the sensors themselves. Their presence allows sensors to self-manage available energy and hence be "free-running"—i.e. operable independent of the system controller. When electrical power is sufficient to do so, values may be acquired from transducers of the sensors and the acquired values transmitted by the data light emitter to the data light receiver via the light couplings and optical fibers.

Although potentially useful for many purposes, systems of the present invention may have especial value in connection with aircraft fuel tanks. They may provide reliable service notwithstanding placement in explosive environments, may facilitate avoidance of eye injuries during certain repair or maintenance operations, and may supply reliability compatible with aircraft fuel tank applications. Integrity of transmitted data further may be enhanced through use of a digital encoding data bus.

It thus is an optional, non-exclusive object of the present invention to provide improved optical sensing systems.

It is a further optional, non-exclusive object of the present invention to provide sensing systems configured for reliable use in certain hazardous environments, including within fuel tanks of vehicles such as aircraft.

It is also an optional, non-exclusive object of the present invention to provide sensing systems avoiding need for any metallic wires to transmit power or data through an explosive environment.

It is, moreover, an optional, non-exclusive object of the present invention to provide sensing systems with automatic power reduction capabilities should, for example, breakage of an optical fiber be detected.

It is an additional optional, non-exclusive object of the present invention to provide self-managing, "free-running" sensors that may operate independent of a system controller.

It is another optional, non-exclusive object of the present invention to provide optical sensing systems in which preferred versions have a 1:1 correspondence between sensors and optical fibers.

Other objects, features, and advantages of the present invention will be apparent to those skilled in the appropriate field with reference to the remaining text and the drawings of this application.

DETAILED DESCRIPTION

Figure 1:
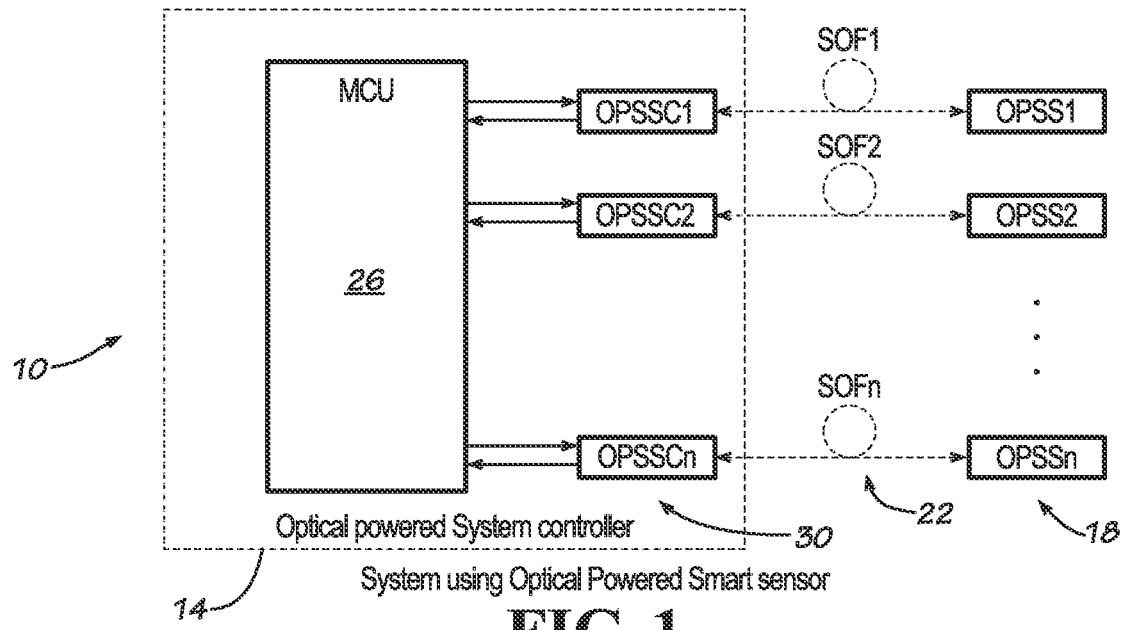
FIG. 1 is a schematic diagram of an exemplary system consistent with the present invention.

Illustrated in FIG. 1 is an exemplary sensing system 10 of the present invention. Included as part of system 10 may be system controller 14, one or more sensors 18, and one or more optical fibers 22. Optical fibers 22 function to transmit energy (power) and data between the sensors 18 and the system controller 14. The optical fibers 22 thus replace metal wires often used to transfer energy or information in the form of electricity.

As shown in FIG. 1, system controller 14 may include both microcontrol unit 26 and one or more sensor controls 30. In the preferred version of system 10 depicted in FIG. 1, a single optical fiber 22 couples each sensor 18 to a corresponding sensor control 30. While presently preferred, such 1:1 correspondence among fibers 22, sensors 18, and sensor controls 30 is not absolutely necessary, however.

Figure 2:
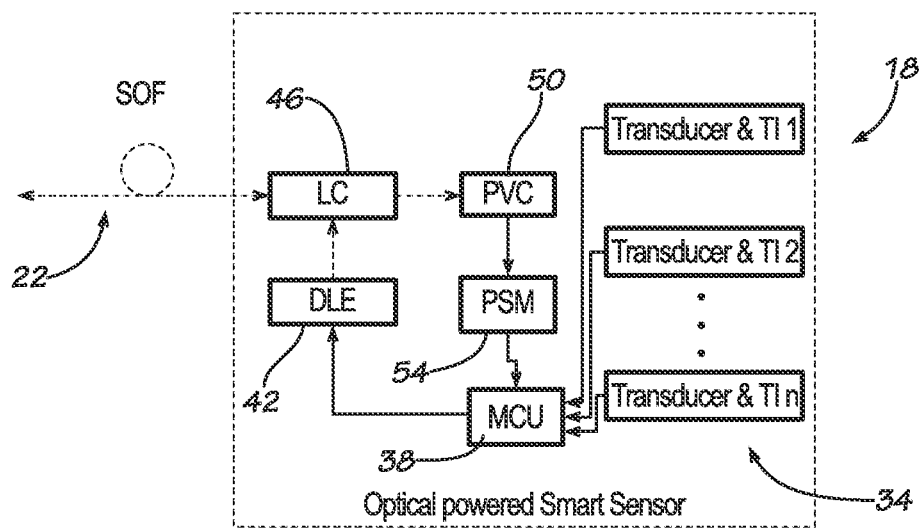
FIG. 2 is a schematic diagram of a sensor component of the system of FIG. 1.

FIG. 2 shows a sensor 18 together with its corresponding optical fiber 22. Sensor 18 may comprise one or more transducers 34 (and associated interfaces) capable of measuring or otherwise sensing information of value to system 10. Transducers may be capacitive or resistive (e.g. capacitive probe level, capacitance index compensator, NTC or PTC thermistance, water level) or otherwise as desired. Sensor 18 additionally may include a controller such as microcontrol unit 38 configured to receive information from transducers 34 and process the information sufficiently for communication to data light emitter 42, which in cooperation with light coupling 46 may emit light for conveyance through optical fiber 22. Also illustrated as part of sensor 18 are photovoltaic cell 50 and power supply management circuitry 54, which may form part of the smart system electronics 58 of FIG. 3.

Figure 3:
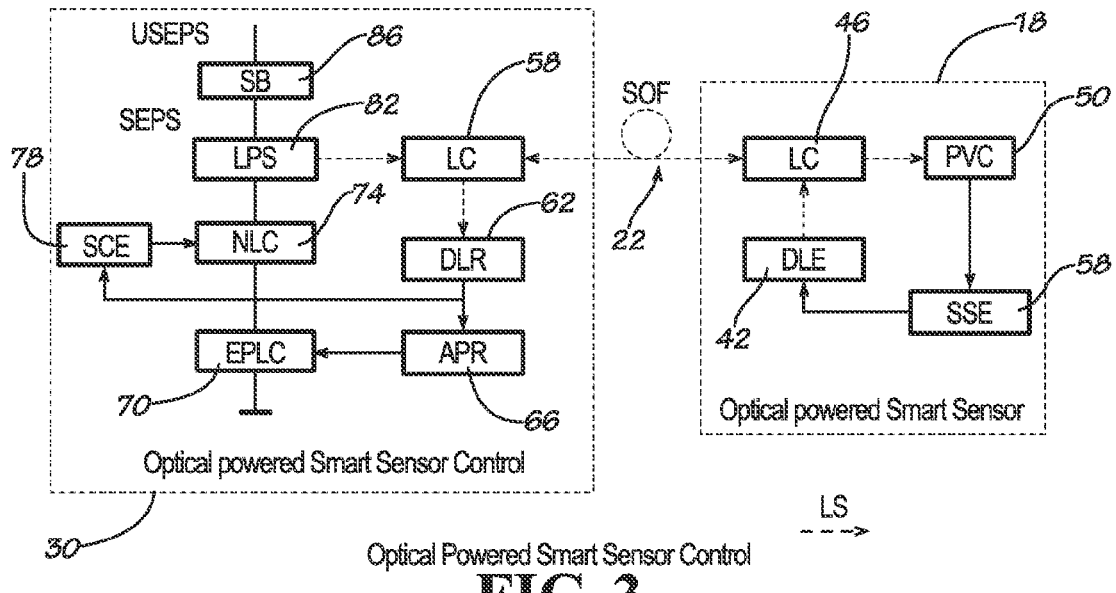
FIG. 3 is a schematic diagram of control and sensor components of the system of FIG. 1.

Additionally detailed in FIG. 3 are components of sensor control 30. Such components may include light coupling 58, data light receiver 62, and automatic power reduction circuitry 66. Also preferably present in sensor control 30 are eye-protection light control circuitry 70, normal light control circuitry 74, system controller electronics 78, and light power source 82. Yet additionally, safety barrier circuitry 86 may be included as part of sensor control 30.

Figure 4:
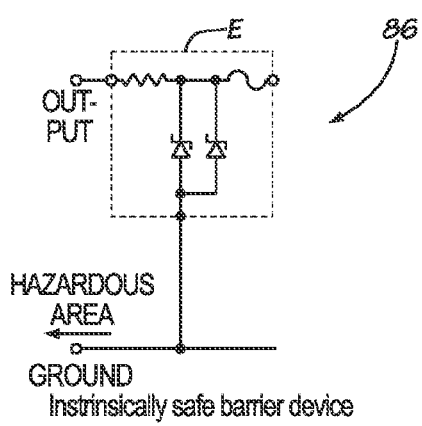
FIG. 4 is a schematic diagram of an exemplary electronic safety barrier circuit for use as part of the system of FIG. 1.
Figure 5:
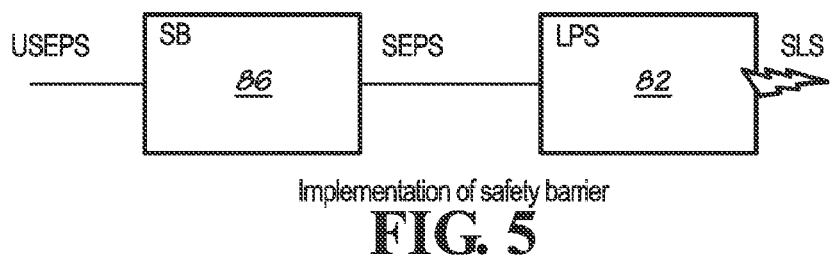
FIGS. 5-6 are block diagrams of an implementation of the safety barrier circuit of FIG. 4.
Figure 6:
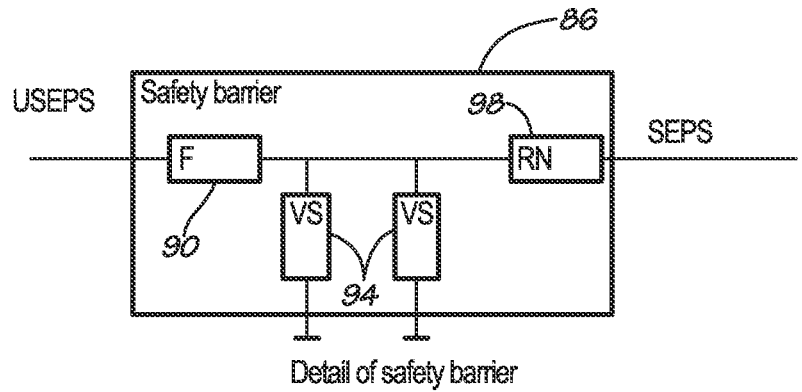

One of multiple possible examples of safety barrier circuitry 86 appears in FIG. 4. As disclosed in U.S. Pat. No. 5,144,517 to Wieth, whose entire contents are incorporated herein by this reference, barrier module "E" of that patent includes zener diodes functioning to shunt current paths should overvoltages or overcurrents arise. Resulting when necessary is opening of a fuse, thereby precluding current flow. FIGS. 5-6 provide block diagrams of similar exemplary circuitry 86, illustrating fuse 90, (preferably) parallel voltage suppressors 94 to limit overvoltages, and resister network 98 to limit overcurrents. Types and values of these elements may be selected by those skilled in the art so as to prevent emitted optical radiation from exceeding ignition levels of any explosive substance through which the radiation passes.

Eye-protection light control circuitry 70 and normal light control circuitry 74, preferably independent circuits, may be interposed in series between light power source 82 and ground. Circuitry 70 and 74 thus allow current circulation through the light power source 82, hence allowing light emission. Advantageously, normal light control circuitry 74 is controlled by system controller electronics 78, which may energize or de-energize light power source 82, or adjust its power level for power efficiency optimization (or otherwise). Power levels of light power source 82 may be adjusted using refresh times of measurements and achieved via pulse width modulation (PWM) or linear regulation, for example. Preferably, average power during a measurement cycle may be used to define a power level. Evaluating power levels as a function of refresh times may beneficially allow a health monitoring of optical paths, permitting preventative maintenance to be scheduled before occurrence of any failure which might ground an aircraft for unscheduled maintenance.

Figure 7:
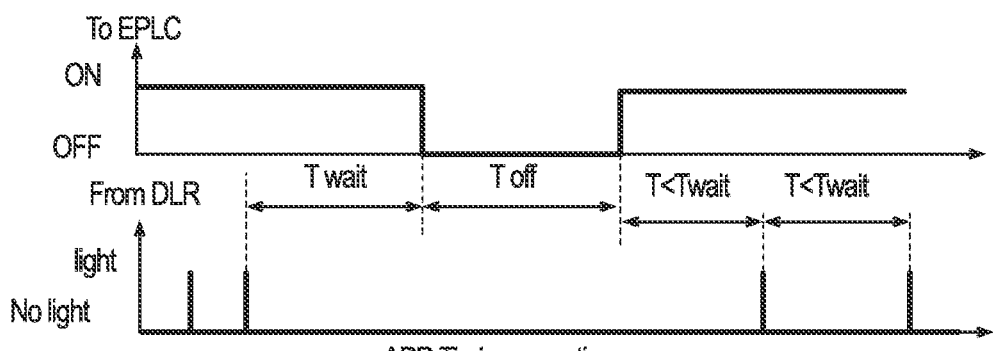
FIG. 7 is a diagram illustrating exemplary timing of operation of an automatic power reduction circuit useful as part of the system of FIG. 1.
Figure 8:
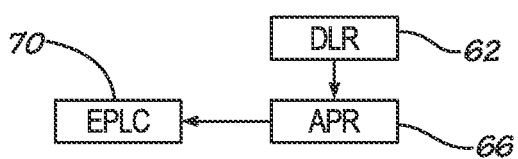
FIG. 8 is a block diagram of interfaces of the automatic power reduction circuit of FIG. 7.

Eye-protection light control circuitry 70, by contrast, beneficially is controlled by automatic power reduction circuitry 66 (see FIG. 8) and may de-energize light power source 82 (or, in some versions, adjust its power level) when necessary. As shown in FIG. 7, automatic power reduction circuitry 66 preferably de-energizes light power source 82 if no data transmission from data light emitter 42 is received during a selected interval ($T_{wait}$). The interval may be initialized by light reception or by the release of power.

Figure 9:
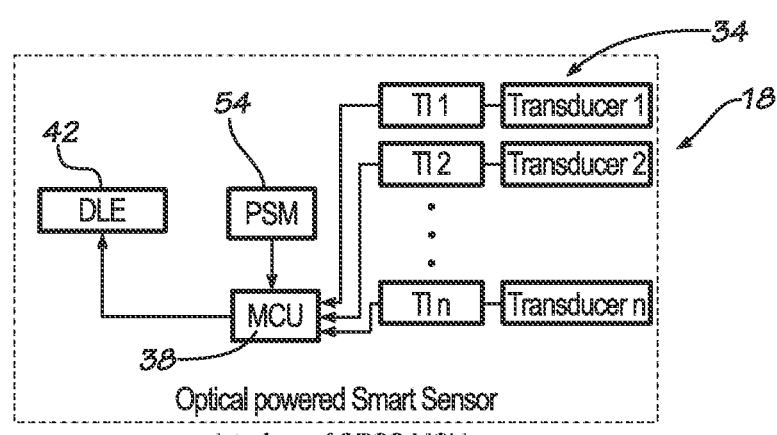
FIG. 9 is another schematic diagram of the sensor component of FIG. 2.

FIG. 9 illustrates, among other things, inclusion of microcontrol unit 38 in sensor 18. Using information from power supply management circuitry 54, microcontrol unit 38 acquires information from transducers 34 when available electrical power is sufficient to do so. In at least this sense sensor 18 thus is free-running, with microcontrol unit 38 acquiring information from transducers 34 as fast as possible given the electrical power then-currently available. Or, stated differently, sensor 18 harvests energy and performs when sufficient energy is available. Hence, sensor 18 is not synchronized with system controller 14; no extra energy need ever be sent to sensor 18, and essentially no energy is wasted. After acquiring information, microcontrol unit 38 may transmit, using a digital encoding protocol, the measurements (or other information) through data light emitter 42. Use of the digital bus allows for integrity data checks to occur, with such possible checks including, but not being limited to, parity bits, checksums, or cyclic redundancy checks depending on importance of the data. Additionally, need for maintenance may be predicted if power increases are necessary to obtain a desired refresh rate.

Figure 10:
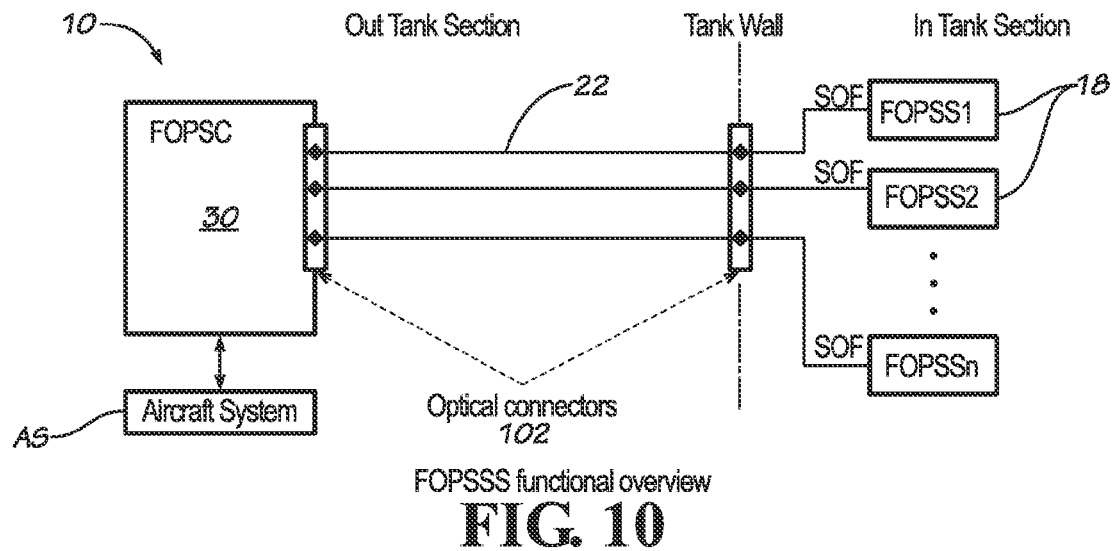
FIG. 10 is a functional diagram of the system of FIG. 1 as used in a fuel tank.
Figure 11:
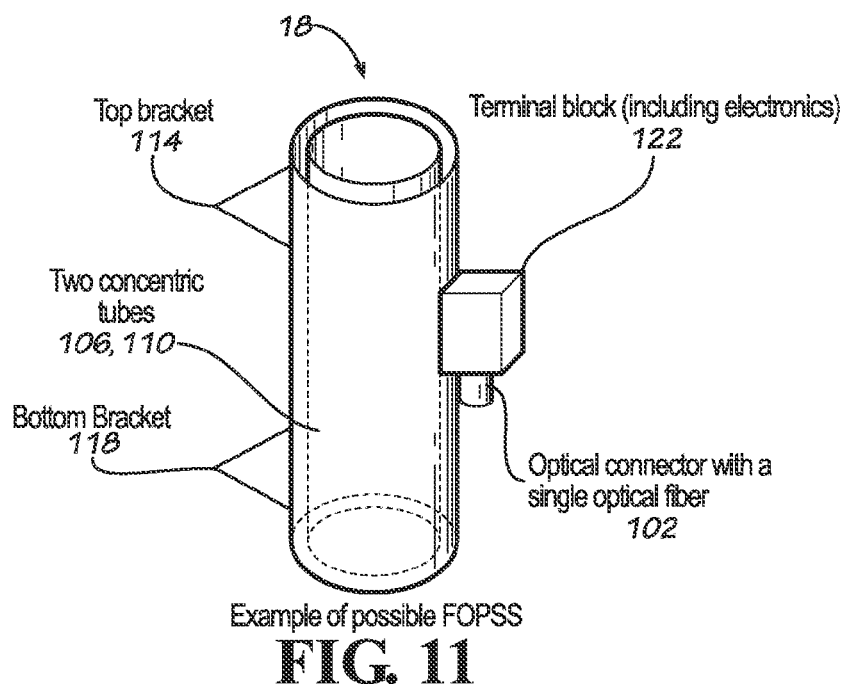
FIG. 11 is a partly-schematicized depiction of a sensor consistent with FIGS. 2 and 9.
Figure 12:
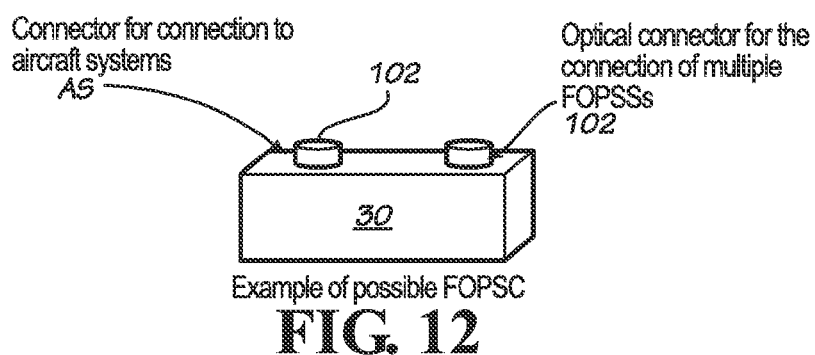
FIG. 12 is a partly-schematicized depiction of a controller consistent with FIG. 3.

As noted earlier, system 10 is especially useful as sensors of fuel-related information in aircraft fuel tanks. FIG. 10 depicts system 10 deployed in this manner, with sensors 18 (designated with the prefix "FOPSS") being inside a fuel tank and control 30 (designed "FOPSC") being outside the tank. Control 30 may communicate with other systems AS of an aircraft in any appropriate manner. Because optical fibers 22 extend between connectors 102 of control 30 and sensors 18, no metal wires need connect control 30 and sensors 18. FIG. 11 shows a sample sensor 18 comprising two concentric tubes 106 and 110, top and bottom brackets 114 and 118, respectively, optical connector 102 with optical fiber 22, and terminal block 122 including electronics. FIG. 12 depicts a sample control 10 including optical connectors 102 for connection to aircraft systems AS and sensor 18.

The foregoing is provided for purposes of illustrating, explaining, and describing embodiments of the present invention. Modifications and adaptations to these embodiments will be apparent to those skilled in the art and may be made without departing from the scope or spirit of the invention.

What is claimed is:

1. An optical sensing system for an aircraft having a fuel tank, comprising:
   a. a system controller;
   b. a first sensor positioned within the fuel tank of the aircraft; and
   c. at least one optical fiber; and
   in which (i) the system controller comprises (A) means for transmitting optical energy to the first sensor via the at least one optical fiber and (B) means for receiving optical data from the first sensor via the at least one optical fiber and (ii) the first sensor comprises (A) means, positioned within the fuel tank of the aircraft, for converting received optical energy to electrical energy and (B) means, positioned within the fuel tank of the aircraft, for transmitting optical data as available electrical energy permits.

2. An optical sensing system according to claim 1 in which the system controller further comprises means for limiting optical energy transmitted to the first sensor.

3. An optical sensing system according to claim 2 in which the means for limiting optical energy transmitted to the first sensor operates as a function of whether the first sensor has transmitted optical data during a predetermined or determinable period of time.

4. An optical sensing system according to claim 2 in which (a) the means for transmitting optical energy to the first sensor comprises a light power source and (b) the means for limiting optical energy transmitted to the first sensor operates as a function of whether electrical power available to the light power source exceeds a predetermined or determinable value.

5. An optical sensing system according to claim 1 in which (a) the first sensor further comprises a controller and (b) the means for transmitting optical data comprises a digital data encoding protocol.

6. An optical sensing system according to claim 5 in which the digital data information comprises integrity check data.

7. An optical sensing system according to claim 1 in which the first sensor further comprises means for sensing a characteristic associated with the fuel tank of the aircraft.

8. An optical sensing system according to claim 1 further comprising a second sensor and the at least one optical fiber comprises first and second optical fibers, (a) the first optical fiber conveying optical energy from the system controller to the first sensor and optical data from the first sensor to the system controller and (b) the second optical fiber conveying optical energy from the system controller to the second sensor and optical data from the second sensor to the system controller.

9. An optical sensing system according to claim 1 further comprising (a) a light power source and (b) means for adjusting a power level of the light power source for improved operational efficiency.

10. An optical sensing system according to claim 1 further comprising an electronic safety barrier for restricting a level of the transmitted or received optical energy.

11. An optical sensing system for an aircraft having a fuel tank, comprising:
   a. a system controller positioned at least partially outside the fuel tank of the aircraft and configured to communicate with at least one other system of an aircraft;
   b. first and second sensors positioned within the fuel tank of the aircraft; and
   c. first and second optical fibers positioned at least partially outside the fuel tank of the aircraft; and
   in which (i) the system controller comprises (A) means for transmitting optical energy to the first sensor via only the first optical fiber and to the second sensor via only the second optical fiber, (B) means for receiving optical data from the first sensor via only the first optical fiber and from the second sensor via only the second optical fiber, and (C) means for limiting optical energy transmitted to at least one of the first and second sensors and (ii) each of the first and second sensors comprises (A) means, positioned within the fuel tank of the aircraft, for converting received optical energy to electrical energy, (B) means, positioned within the fuel tank of the aircraft, for transmitting optical data as available electrical energy permits, and (C) a controller.

12. A sensing method comprising:
    a. transmitting optical energy to a sensor positioned within a fuel tank of an aircraft via an optical fiber;
    b. at the sensor positioned within the fuel tank of the aircraft, converting the optical energy to electrical energy;
    c. when sufficient electrical energy exists at the sensor to do so, sensing information relating to the environment of the sensor; and
    d. when sufficient electrical energy exists at the sensor to do so, transmitting the sensed information from within the fuel tank of the aircraft to a system controller via the optical fiber.

13. A sensing method according to claim 12 further comprising reducing the amount of optical energy transmitted to the sensor when the optical fiber is broken.

14. A sensing method according to claim 12 further comprising reducing the amount of optical energy transmitted to the sensor to less than an amount that would ignite flammable fluid present in the environment of the sensor.

15. An optical sensing system for an aircraft having a fuel tank, comprising:
    a. a system controller positioned at least partially outside the fuel tank of the aircraft;
    b. a first sensor not synchronized with the system controller; and
    c. at least one optical fiber; and
    in which (i) the system controller comprises (A) means for transmitting optical energy to the first sensor via the at least one optical fiber and (B) means for receiving optical data from the first sensor via the at least one optical fiber and (ii) the first sensor comprises (A) means for converting received optical energy to electrical energy and (B) means for transmitting optical data as available electrical energy permits, such means comprising a microcontrol unit positioned within the fuel tank of the aircraft and configured to acquire sensed information as available electrical energy permits.

16. An optical sensing system according to claim 15 in which the system controller further comprises means for limiting optical energy transmitted to the first sensor.

17. An optical sensing system according to claim 16 in which the means for limiting optical energy transmitted to the first sensor operates as a function of whether the first sensor has transmitted optical data during a predetermined or determinable period of time.

18. An optical sensing system according to claim 16 in which (a) the means for transmitting optical energy to the first sensor comprises a light power source and (b) the means for limiting optical energy transmitted to the first sensor operates as a function of whether electrical power available to the light power source exceeds a predetermined or determinable value.

19. An optical sensing system according to claim 15 in which (a) the first sensor further comprises a controller and (b) the means for transmitting optical data comprises a digital data encoding protocol.

20. An optical sensing system according to claim 15 in which the first sensor further comprises means for sensing a characteristic associated with the fuel tank of the aircraft.

21. An optical sensing system according to claim 15 further comprising a second sensor and the at least one optical fiber comprises first and second optical fibers, (a) the first optical fiber conveying optical energy from the system controller to the first sensor and optical data from the first sensor to the system controller and (b) the second optical fiber conveying optical energy from the system controller to the second sensor and optical data from the second sensor to the system controller.

* * * * *